United States Patent
Xin et al.

(10) Patent No.: US 9,952,631 B2
(45) Date of Patent: Apr. 24, 2018

(54) CONNECTING DEVICE AND ELECTRONIC APPARATUS

(71) Applicant: Lenovo (Beijing) Co., Ltd., Beijing (CN)

(72) Inventors: Zhifeng Xin, Beijing (CN); Xiaosong Xia, Beijing (CN)

(73) Assignee: LENOVO (BEIJING) CO., LTD., Haidian District, Beijing (CN)

(*) Notice: Subject to any disclaimer, the term of this patent is extended or adjusted under 35 U.S.C. 154(b) by 0 days.

(21) Appl. No.: 14/835,683

(22) Filed: Aug. 25, 2015

(65) Prior Publication Data

US 2017/0023985 A1    Jan. 26, 2017

(30) Foreign Application Priority Data

Jul. 21, 2015  (CN) .......................... 2015 1 0432333

(51) Int. Cl.
  *G06F 1/16*  (2006.01)
  *H05K 7/00* (2006.01)

(52) U.S. Cl.
  CPC .......... *G06F 1/1681* (2013.01); *G06F 1/1616* (2013.01); *G06F 1/1637* (2013.01); *G06F 1/1641* (2013.01); *G06F 1/165* (2013.01)

(58) Field of Classification Search
  None
  See application file for complete search history.

(56) References Cited

U.S. PATENT DOCUMENTS

| | | | | |
|---|---|---|---|---|
| 9,348,450 | B1* | 5/2016 | Kim ...................... | G06F 3/0412 |
| 2012/0194448 | A1* | 8/2012 | Rothkopf ............. | A45C 13/002 345/173 |
| 2012/0248048 | A1* | 10/2012 | Wu ........................ | F16M 11/10 211/26 |
| 2014/0226275 | A1* | 8/2014 | Ko ......................... | G06F 1/1626 361/679.27 |
| 2015/0233162 | A1* | 8/2015 | Lee ......................... | H04M 1/02 16/223 |
| 2016/0085268 | A1* | 3/2016 | Aurongzeb ........... | G06F 1/1652 345/156 |
| 2016/0187935 | A1* | 6/2016 | Tazbaz .................. | G06F 1/1681 361/679.03 |

* cited by examiner

*Primary Examiner* — Courtney Smith
*Assistant Examiner* — Rashen E Morrison
(74) *Attorney, Agent, or Firm* — Brinks Gilson & Lione; G. Peter Nichols (57) ABSTRACT

A connecting device configured to rotatably connect a first main body and a second main body of electronic apparatus includes a rotating mechanism rotatably connecting the first main body and the second main body; a coating mechanism covering at least a part of the rotating mechanism; and a magnetic mechanism magnetically coupling the coating mechanism and the rotating mechanism together. The connecting device disclosed in the present disclosure improves man-machine interaction, and enables the user to enjoy a better experience.

14 Claims, 9 Drawing Sheets

CONNECTING DEVICE AND ELECTRONIC APPARATUS

This application claims priority to Chinese patent application No. 201510432333.6 filed on Jul. 21, 2015, the entire contents of which are incorporated herein by reference.

The present disclosure relates to an electronic apparatus, in particular to a connecting device configured to rotatably connect a first main body and a second main body of the electronic apparatus.

BACKGROUND

In the present era, science and technology is rapidly changing people's life style; the improvement of an electronic apparatus is one of the crucial factors. An electronic apparatus becomes more and more intelligent and brings a comfortable and convenient life for us. In addition, their man-machine interaction becomes better increasingly. For examples, the structures of electronic apparatus are optimized and esthetic in appearance increasingly.

Common electronic apparatus, such as laptop PCs, tablet PCs, and cell phones, etc., usually include a first main body and a second main body that can rotate in relation to each other and are connected to each other via a connecting device. The applicant has been engaged in the research, development, and manufacturing of electronic apparatus for long, and has made extensive and in-depth researches on electronic apparatus and their connecting device described above. For example, the applicant has put forth a connecting device that is usually referred to as a "watch band hinge". The applicant has found that the existing connecting device have drawbacks and must be improved further.

Figure 1:
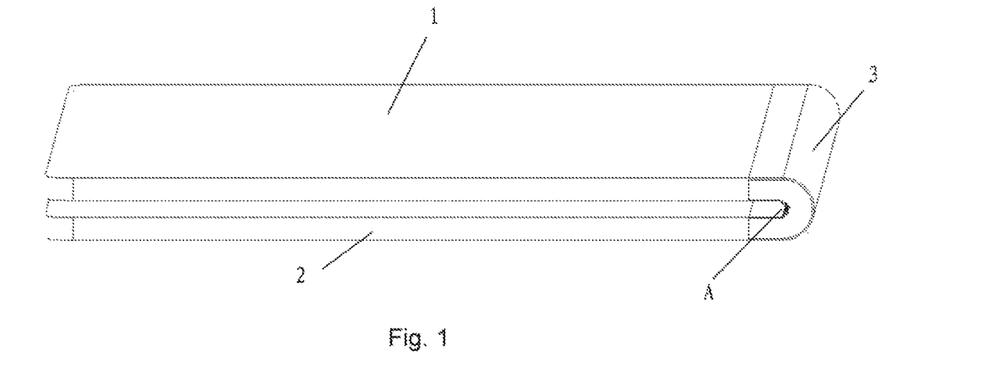
FIG. 1 is a 3D view of the electronic apparatus in the prior art.
Figure 2:
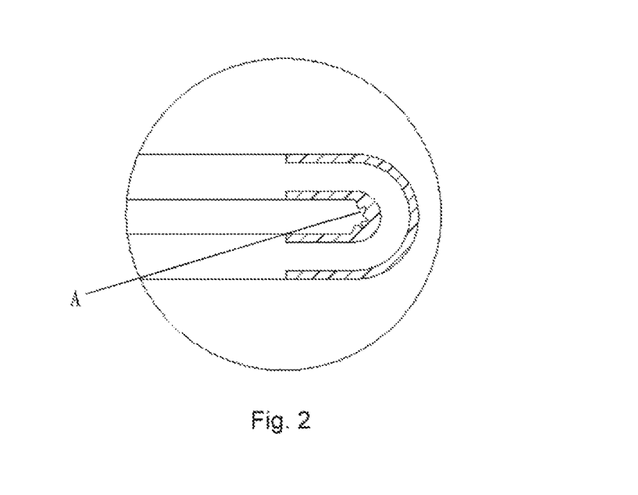
FIG. 2 is a partially enlarged view of the structure shown in FIG. 1.

FIG. 1 and FIG. 2 show a problem in the connection between the main bodies of existing electronic apparatus, wherein FIG. 2 is a partially enlarged view of the structure shown in FIG. 1. The device shown in FIG. 1 includes a display side 1 and a system side 2, i.e., a first main body and a second main body, which are connected together via a connecting device 3. It can be seen in FIG. 1 and FIG. 2: folds and crumples may occur on the compressed surfaces of the connecting device 3 when the display side 1 and the system side 2 are folded. When folds and crumples occur at the display side 1 and the system side 2, not only the connecting device 3 may be degraded quickly, but also inconvenience is introduced in the use of the device and the appearance of the device is compromised.

Hence, it is necessary to further optimize the connecting device for electronic apparatus, so as to improve product quality and man-machine interaction. Of course, generally there is always a demand for new solutions for electronic apparatus.

SUMMARY

An object of the present disclosure is to provide an improved connecting device, to prevent occurrence of folds and crumples on compressed surfaces, and thereby improve man-machine interaction and enable the user to enjoy a better experience.

Another object of the present disclosure is to provide improved an electronic apparatus, which employs the connecting device disclosed in the present disclosure to improve product quality.

Accordingly, the present disclosure provides a connecting device configured to rotatably connect a first main body and a second main body of an electronic apparatus, the connecting device comprising: a rotating mechanism rotatably connecting the first main body and the second main body; a coating mechanism covering at least a part of the rotating mechanism; and a magnetic mechanism magnetically coupling the coating mechanism and the rotating mechanism together.

Preferably, the magnetic mechanism comprises a first magnetic element disposed on the coating mechanism and a second magnetic element disposed on the rotating mechanism, coupling each other together magnetically.

Preferably, the rotating mechanism comprises elements made of a ferromagnetic material, the coating mechanism comprises a first coating element that covers a first side of the rotating mechanism, and the magnetic mechanism includes the magnetism of the first coating element.

Preferably, the coating mechanism includes a second coating element that covers a second side of the rotating mechanism, and the magnetic mechanism includes the magnetism of the second coating element.

Preferably, the magnetisms of the first coating element comprises a first magnetism part and the second coating element comprises a second magnetism part, and the first magnetism part and the second magnetism part produce force of attraction with each other as the rotating mechanism is rotated or bent.

Preferably, the first magnetism part and the second magnetism part are made of a magnetic material.

Preferably, the first magnetic element is attached to a bending part of the coating mechanism, and the bending part is bent as the rotating mechanism is rotated or bent.

Preferably, a magnetic element/magnetic elements having magnetism is/are attached to a bending part/bending parts of the first coating element and/or the second coating element, and the bending part/bending parts is/are bent as the rotating mechanism is rotated or bent.

Preferably, the magnetism is arranged discontinuously along a transverse axis of the rotating mechanism.

Preferably, the coating mechanism is a flexible coating component made of silica gel.

Preferably, the rotating mechanism is formed into a strip shape.

The present disclosure further provides an electronic apparatus comprising the connecting device disclosed in the present disclosure, wherein at least one of the first main body and the second main body is fitted with a display screen, or the first main body and the second main body are fitted with an integral display screen which can be bent freely at a part corresponding to the connecting device.

Preferably, in the case that at least one of the first main body and the second main body is fitted with the display screen, the electronic apparatus is provided with an additional small display screen configured to display information that contains prompting or aiding content at least at one side of a part of the electronic apparatus corresponding to the connecting device; or, in the case that the first main body and the second main body are fitted with the integral display screen, the part of the integral display screen corresponding to the connecting device can display as a small display screen for displaying information that contains prompting or aiding content and/or the electronic apparatus is fitted with an additional small display screen configured to display information that contains prompting or aiding content at the other side of the connecting device.

Preferably, the electronic apparatus is a tablet PC.

The connecting device put forth in the present disclosure can prevent occurrence of folds and crumples on compressed surfaces, and thereby improves man-machine interaction and enables the user to enjoy a better experience.

Moreover, since the electronic apparatus put forth in the present disclosure employs the connecting device disclosed in the present disclosure, it has improved product quality, improved man-machine interaction, and obtains new functions.

DETAILED DESCRIPTION

Hereinafter some embodiments of the connecting device provided in the present disclosure will be detailed with reference to the accompanying drawings.

The embodiments described here are specific embodiments of the present disclosure, and are provided only to explain the concept of the present disclosure. All these embodiments are explanatory and exemplary, and shall not be interpreted as constituting any limitation to the embodiments and the scope of the present disclosure. Besides the embodiments described here, those skilled in the art can use other obvious technical solutions on the basis of the disclosure in the attached claims and the specification, and these technical solutions include those that are obtained by making obvious substitutions and modifications to the embodiments described here.

The accompanying drawings are schematic diagrams, which are provided to aid the description of the concept in the present disclosure and schematically illustrate the shapes of the parts and the relations among the parts. It should be noted that the accompanying drawings may not be drawn at the same scale, for the purpose of clearly presenting the structures of the components in the embodiments of the present disclosure. Like reference marks are used in the drawings to denote like elements. In addition, in the description made with reference to the accompanying drawings, terms that denote directions or orientations, such as "top", "bottom", "front", and "back", etc., are used for the convenience of expression, but they don't constitute any particular limitation to the structures of the features.

Figure 3:
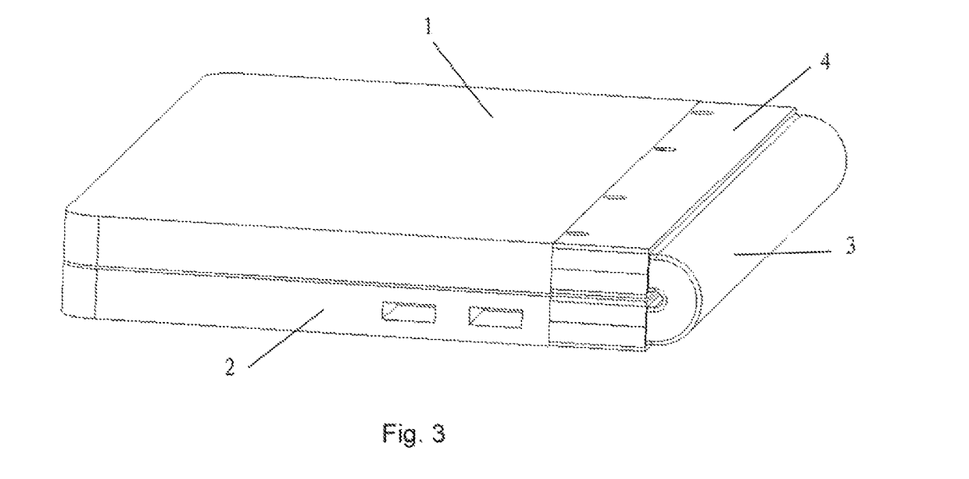
FIG. 3 is a 3D view of an embodiment of the electronic apparatus disclosed in the present disclosure.
Figure 4:
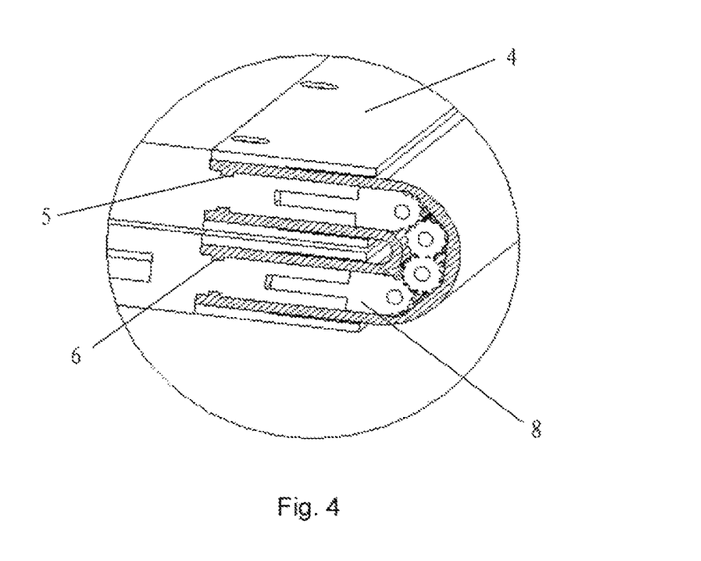
FIG. 4 is a partially enlarged view of the structure shown in FIG. 3.
Figure 5:
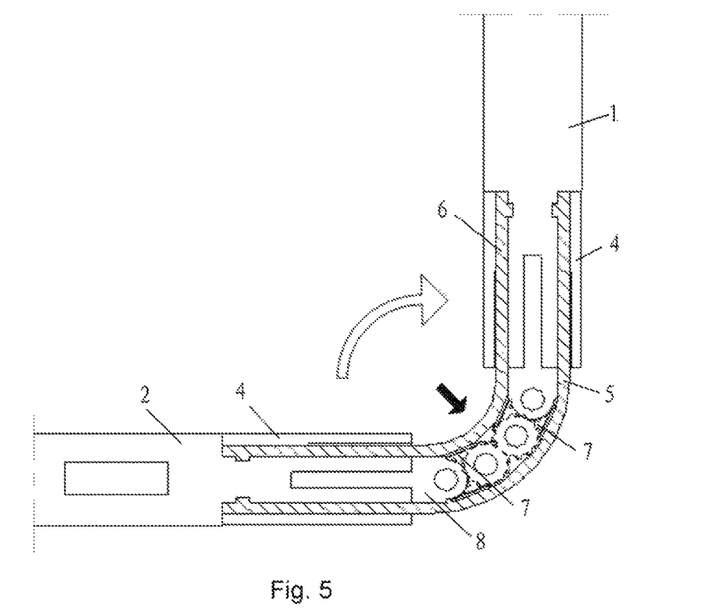
FIG. 5 is a schematic partial sectional view of the electronic apparatus shown in FIG. 3 when the first main body and the second main body are at 90° in relation to each other.
Figure 6:
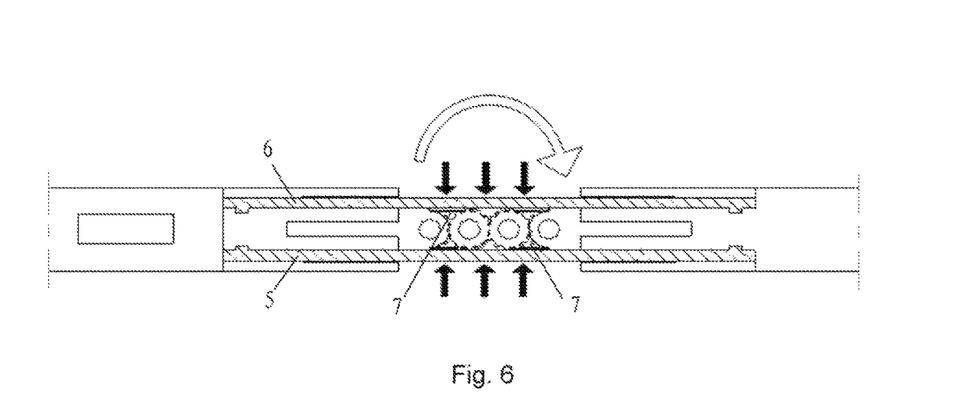
FIG. 6 is a schematic partial sectional view of the electronic apparatus shown in FIG. 3 when the first main body and the second main body are at 180° in relation to each other.

FIG. 3 is a 3D view of an embodiment of the electronic apparatus disclosed in the present disclosure. FIG. 4 is a partially enlarged view of the structure shown in FIG. 3, FIG. 5 is a schematic partial sectional view of the electronic apparatus shown in FIG. 3 when the first main body and the second main body are at 90° in relation to each other, and FIG. 6 is a schematic partial sectional view of the electronic apparatus when the first main body and the second main body are at 180° in relation to each other. These drawings are provided to schematically illustrate the structure of the connecting device disclosed in the present disclosure and the fixing and mounting relation of the connecting device disclosed in the present disclosure with other parts of the electronic apparatus.

The electronic apparatus can be an electronic apparatus with folding function, such as a laptop PC, tablet PC, or cell phone, etc., and includes a first main body 1, a second main body 2, and a connecting device 3 configured to rotatably connect the first main body 1 and the second main body 2, with pressing plates 4 configured to fix the connecting device 3 to the first main body 1 and the second main body 2 respectively. In this embodiment, the first main body 1 and the second main body 2 can be particularly embodied as a display side configured to display desired contents and a system side configured to manipulate the electronic apparatus.

As shown in FIGS. 4-6, the connecting device 3 includes: a rotating mechanism 8; a first coating element 5 and a second coating element 6 that cover the outer sides of the rotating mechanism 8; and magnetic elements 7 disposed on the inner side walls of the first coating element 5 and the second coating element 6. The magnetic elements 7 are main elements of the magnetic mechanism in the connecting device 3, and they are provided at the bent sections of the first coating element 5 and the second coating element 6 and produce magnetic attraction force, so as to produce force of attraction with the ferromagnetism elements of the rotating mechanism 8, or the magnetic element 7 disposed on the inner side wall of the first coating element 5 and the magnetic element 7 disposed on the inner side wall of the second coating element 6 attract each other, or the magnetic element 7 disposed on the inner side wall of the first coating element 5 and the magnetic element 7 disposed on the inner side wall of the second coating element 6 attract each other and produce force of attraction with the ferromagnetism elements of the rotating mechanism 8. In FIG. 5 and FIG. 6, the black arrow indicates the magnetic attraction force, while the white arrow indicates the unfolding direction.

Figure 13:
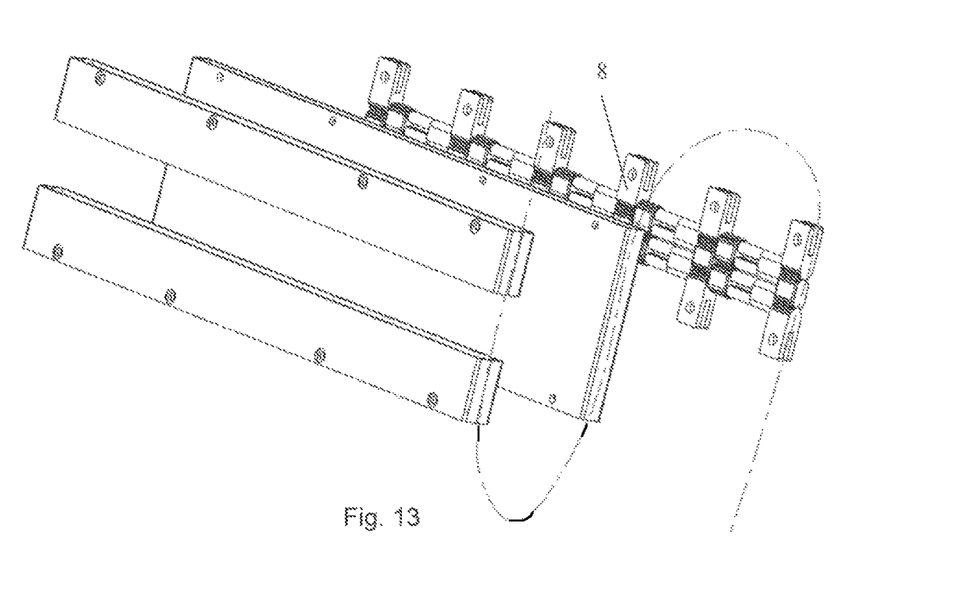
FIG. 13 is a 3D exploded view of the connecting device shown in FIG. 12.
Figure 14:
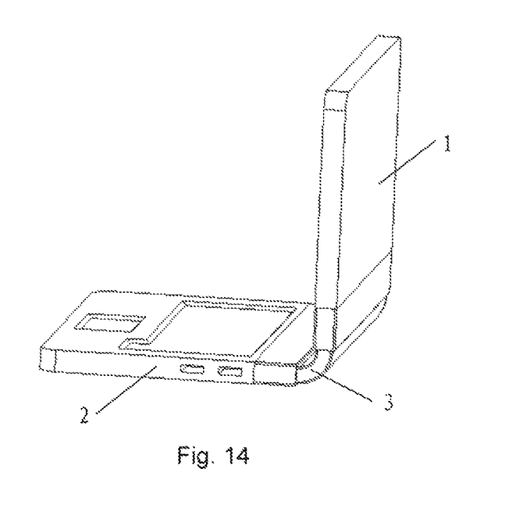
FIG. 14 shows the electronic apparatus in FIG. 1 in a 90° state.
Figure 15:
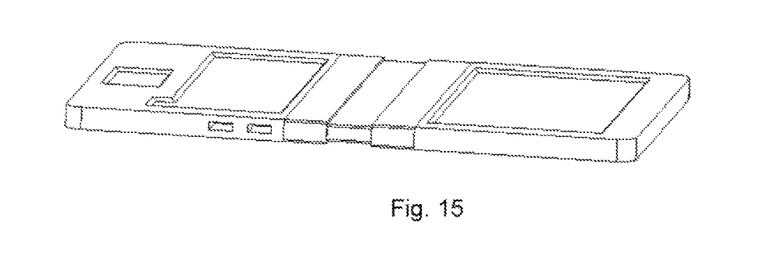
FIG. 15 shows the electronic apparatus in FIG. 1 in a 180° unfolded state.
Figure 16:
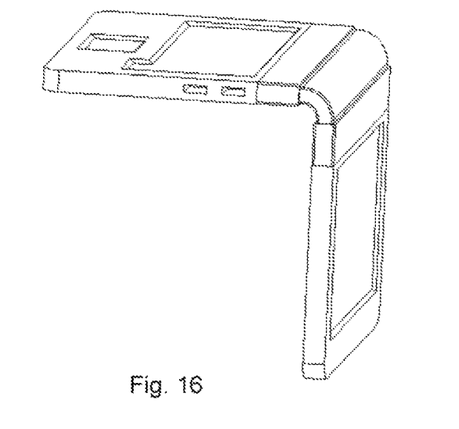
FIG. 16 shows the electronic apparatus in FIG. 1 in a 270° state.
Figure 17:
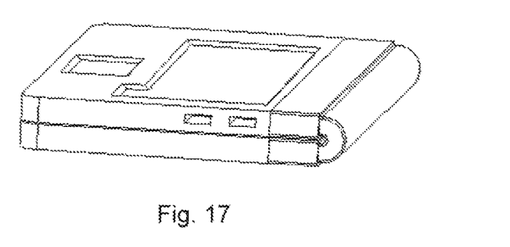
FIG. 17 shows the electronic apparatus in FIG. 1 in a 360° state.

The rotating mechanism 8 in the connecting device 3 disclosed in the present disclosure can employ any structure known in the prior art. The elements of the rotating mechanism 8 can be made of a ferromagnetic material. The rotating mechanism 8 may have one or more rotation axes in the axial direction, namely, the transverse direction of the electronic apparatus, and the rotation axes may be parallel to each other. The rotating mechanism 8 can be formed into a strip shape generally. In the accompanying drawings, the rotating mechanism 8 is particularly embodied as a hinge, i.e., the so-called "watch band hinge" put forth by the applicant. As shown in FIG. 13, the "watch band hinge" is in a strip shape generally. Since the rotating mechanism 8 is in a strip shape generally, both the first coating element 5 and the second coating element 6 that cover the outer sides of the rotating mechanism 8 have certain planar surface area. The larger the planar surface area is, the higher the possibility of occurrence of folds or crumples on the compressed coating elements will be, when the rotating mechanism 8 is bent.

The hinge is shown as having 5 sections in FIG. 13. It should be noted that the number of sections in the hinge shown in the accompanying drawings is only exemplary. In actual implementation, the number of sections can be determined according to the design requirement, and can be a natural number such as 1, 2, 3, 4, 6, 7, 8, . . . , alternatively. The structure of the rotating mechanism 8 will not be further detailed here. In brief, a structure known in the prior art can be used for it.

Figure 7:
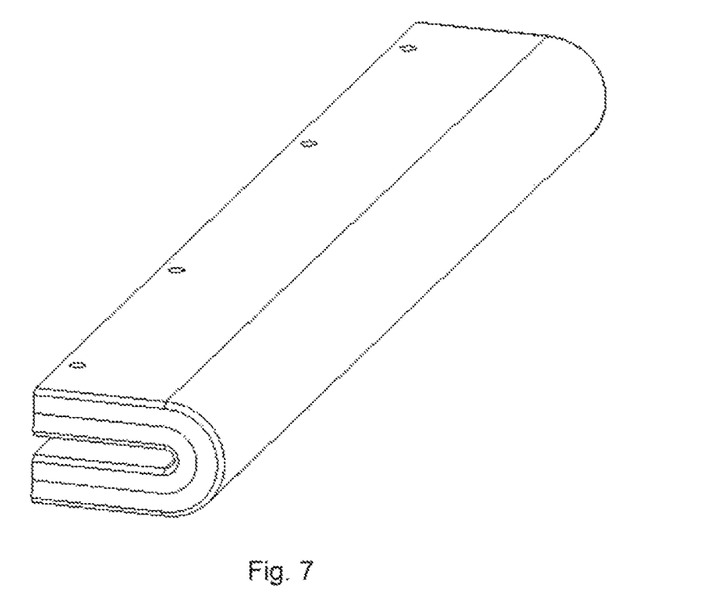
FIG. 7 is a 3D view of the connecting device in folded state in an embodiment of the present disclosure, wherein the coating mechanism includes a first coating element and a second coating element.
Figure 8:
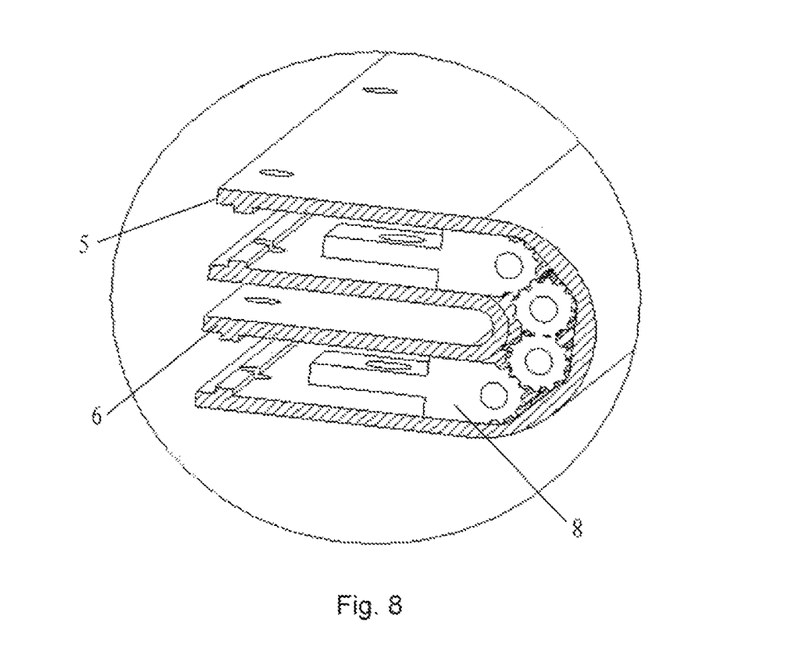
FIG. 8 is an enlarged 3D sectional view of the structure shown in FIG. 7.
Figure 9:
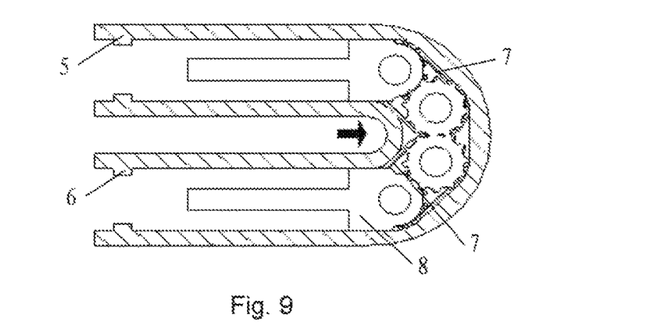
FIG. 9 is a schematic planar sectional view of the internal structure of the assembly shown in FIG. 7 in a 0° folded state.
Figure 10:
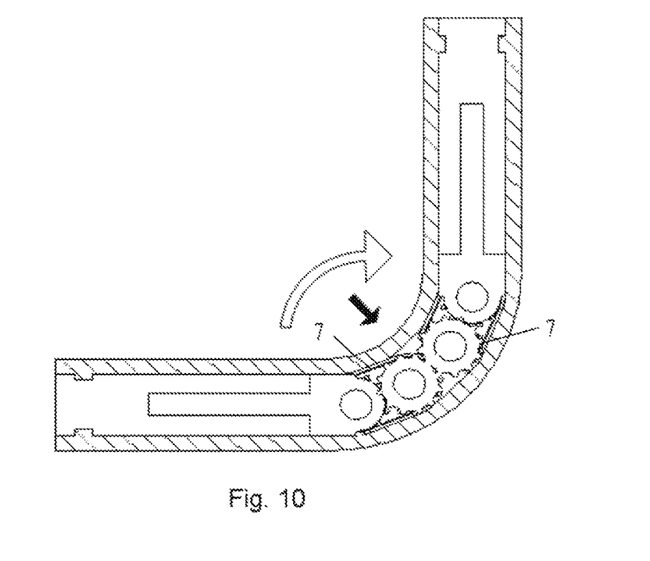
FIG. 10 is a schematic planar sectional view of the internal structure of the assembly shown in FIG. 7 in a 90° unfolded state.
Figure 11:
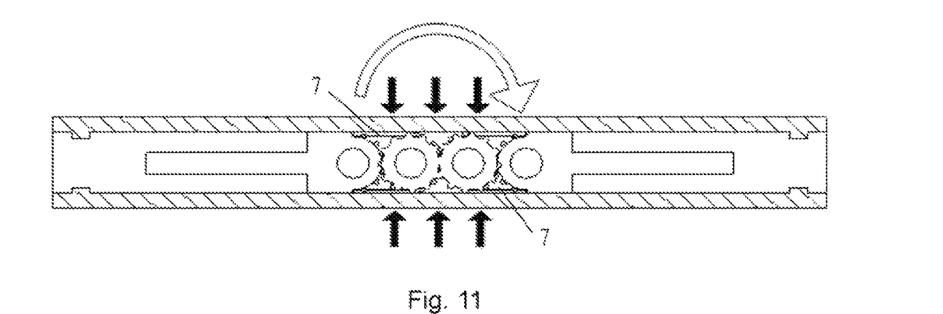
FIG. 11 is a schematic planar sectional view of the internal structure of the assembly shown in FIG. 7 in a 180° unfolded state.

Moreover, FIG. 7 is a 3D view of the connecting device 3 in a folded state in this embodiment, FIG. 8 is a 3D enlarged sectional view of the structure shown in FIG. 7, and FIGS. 9-11 are planar sectional views of the internal structure of the assembly in 0° folded state, 90° unfolded state, and 180° unfolded state, respectively. In FIGS. 7-11, only the connecting device 3, i.e., the assembly of the coating mechanism and the rotating mechanism, is shown, while other components of the electronic apparatus are removed, so as to present the structure of the connecting device 3 more clearly and simply in different states. In FIG. 10 and FIG. 11, the black arrow indicates the magnetic attraction force, while the white arrow indicates the unfolding direction.

Figure 12:
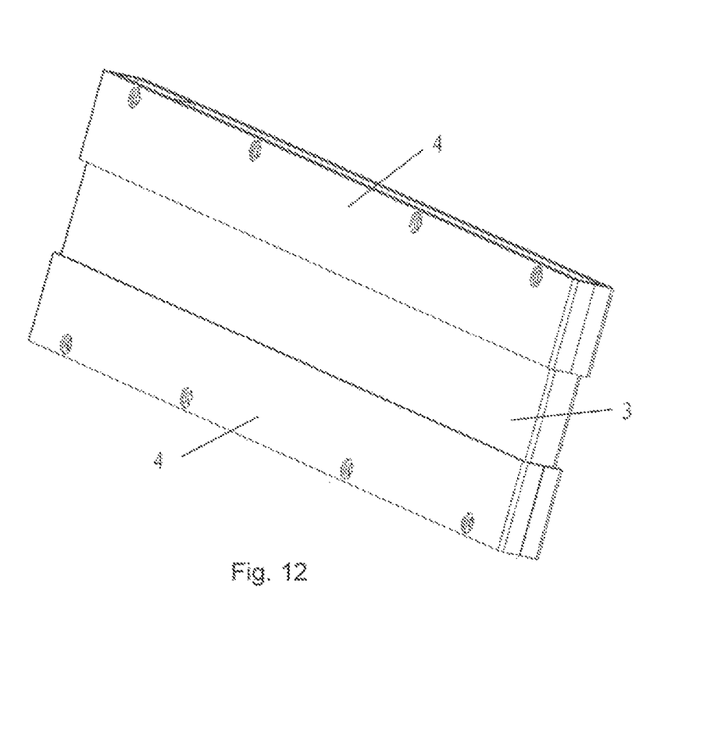
FIG. 12 is a 3D view of the connecting device disclosed in the present disclosure in a 180° unfolded state.

Please see FIG. 12 and FIG. 13 again, in conjunction with the preceding drawings. It is seen that the rotating mechanism 8 is fixedly connected to the first main body 1 and the second main body 2 via its connecting ends arranged in the transverse direction of the electronic apparatus, and pressing plates 4 are fixed to the first main body 1 and the second main body 2 by fastening pieces (e.g., bolts) inserted into the through-holes in the pressing plates 4 and the first coating element 5 and the second coating element 6. In the illustrated embodiment, these through-holes are also arranged in the transverse direction of the electronic apparatus. The direction of the transverse axis of the rotating mechanism is the transverse direction of the electronic apparatus. In specific solutions in which pressing plates 4 exist, apparently the pressing plates 4 can be deemed as components of the connecting device, though the connecting device 3 and the pressing plates 4 are described as separate elements here.

In the state shown in FIG. 11, the coating mechanism 3 is not compressed or stretched, i.e., both the first coating element 5 and the second coating element 6 are not subjected to compression, which corresponds to a neutral state of the rotating mechanism 8 in which the bent part of the rotating mechanism 8 is not bent.

In contrast, when the coating elements are subjected to compression and stretching, i.e., both the first coating element 5 and the second coating element 6 are bent, for example, when the coating mechanism 3 is in a bent state as shown in FIG. 9 and FIG. 10 (namely, the first main body 1 and the second main body 2 are at an angle in relation to each other accordingly), one coating element is stretched, while the other coating element is compressed. Apparently folds or crumples will not occur on a stretched coating element, but, in the prior art, folds or crumples may occur on a compressed coating element.

For example, in the bent state as shown in FIG. 9 and FIG. 10, at the bent part, the first coating element 5 is stretched, while the second coating element 6 is compressed. Since the inner side wall of the second coating element 6 is provided with a magnetic element 7 corresponding to the bent part, the bent part of the second coating element 6 will tend to bend inwardly, and thereby no folds or crumples will occur on the second coating element 6 at the bent part, no matter whether the magnetic element 7 on the inner side wall of the second coating element 6 and the magnetic element 7 on the inner side wall of the first coating element 5 attract each other or the magnetic element 7 on the inner side wall of the second coating element 6 attracts the rotating mechanism 8. In addition, since the inner side walls of the first coating element 5 and the second coating element 6 are provided with a magnetic element 7 corresponding to the bent part, no folds or crumples will occur on the compressed coating element at the bent part, no matter whether the coating mechanism 3 is folded at 0° or is folded at 360°. Hence, the arrangement of the magnetic elements 7 is beneficial for smooth bending of the rotating mechanism 8 in the rotating operation, and can prevent folds or crumples on the coating mechanism 3 when the rotating mechanism 8 is rotated.

The magnetic elements 7 can be arranged on the inner side walls of the coating elements by attaching or embedding.

In the drawings described above, the magnetic elements 7 are shown schematically as being arranged as discrete magnetic elements at the bent part of the coating mechanism 3. Apparently, such a specific arrangement in the embodiment shown in the accompanying drawings is only illustrative and explanatory. The quantity, arrangement, and shape of the magnetic elements 7 can be determined according to the actual design requirement. The basic concept in the present disclosure is to utilize the attracted attachment of the coating elements at the two sides of the rotating mechanism to the sides of the rotating mechanism under magnetic attraction force to prevent the occurrence of folds or crumples on the coating mechanism during bending. Hence, those skilled in the art can design the shape, quantity, and arrangement of the magnetic elements 7 according to the actual demand, on the basis of the basic concept. Thus it can be seen: the magnetic element 7 can include a plurality of discrete magnetic elements or a single integral magnetic element, and the shape and arrangement of the magnetic elements can be selected according to the actual demand. Moreover, the quantity, arrangement, and shape of the magnetic elements 7 can be selected according to the material and hardness of the coating elements. The magnetic elements 7 can cover a portion of the bent part or the entire bent part. Though the magnetic elements 7 are preferably disposed at the bent part, they can be disposed at a position other than the bent part, as long as required attraction force for coupling the coating elements at the two sides of the rotating mechanism to the sides of the rotating mechanism can be obtained.

In addition, in the embodiment described above, though the magnetic mechanism in the connecting device 3 is presented in the form of separate magnetic elements, the magnetic elements of the magnetic mechanism in the connecting device 3 can be integrated with the coating elements alternatively. For example, the coating element can be made of a magnetic material intrinsically, or a part of the coating element (e.g., at least a portion of the bent part) is made of a magnetic material intrinsically though the coating element is an integral piece.

In the embodiment described above, the coating mechanism 3 includes two coating elements, i.e., a first coating element 5 and a second coating element 6. The two coating elements can be separate pieces that are separate from each other, or can be an integral piece, for example, the two coating elements are connected into one piece at their ends in the longitudinal direction of the coating mechanism 3.

Moreover, though both the first coating element 5 and the second coating element 6 are described in the embodiment as having a magnetically coupling element respectively, the magnetic mechanism in the connecting device 3 can be configured to have a magnetically coupling element on one coating element only, instead of having a magnetically coupling element on both coating elements respectively. For example, the coating element at one side may have magnetism, while the coating element at the other side doesn't have magnetism, but is configured to have ferromagnetism and can be attracted to a side of the rotating mechanism under magnetic attraction force.

In the present disclosure, the first coating element 5 and the second coating element 6 of the coating mechanism 3 can be made of the same material as the supporting assembly, or made of a material different from that of the supporting assembly. In the case that the coating element at one side doesn't have magnetism but is configured to have ferromagnetism instead, as described above, the two coating elements at the two sides can be made of different materials. The coating mechanism 3 provides functions of protection, connection, and esthetic appearance. It can be made of any suitable organic material with appropriate toughness and elasticity, such as silica gel.

In addition, in the description of the present disclosure, though the coating mechanism 3 and the rotating mechanism 8 are described as two separate members, those skilled in the art would appreciate that the coating mechanism 3 and the rotating mechanism 8 can be manufactured and assembled with a variety of manufacturing and assembling techniques in the art. Particularly, for example, they can be manufactured by integral molding, so that the coating mechanism is attached to the rotating mechanism at least at some parts, to form the connecting device disclosed in the present disclosure.

Though the through-holes for fixing purpose in the coating mechanism 3 are described as circular holes in the accompanying drawings, alternatively the coating mechanism 3 can be configured to have slotted holes for fixing purpose, the lengthwise direction of which is in the longitudinal direction of the electronic apparatus, in order to provide some freedom for the movement of the first coating element 5 and the second coating element 6 of the coating mechanism 3 during bending, so that the first coating element 5 and the second coating element 6 can slide in the longitudinal direction of the electronic apparatus during bending. On that basis, those skilled in the art can design a coating mechanism 3 with a different bending pattern.

The rotating mechanism described in the present disclosure can avoid the occurrence of folds and crumples on the compressed surfaces of the coating mechanism, and thereby the rotation of the rotating mechanism is smoother and has high quality. Thus, the man-machine interaction can be improved, and the use can enjoy a better experience. As shown in FIGS. 14-17, with the rotating mechanism disclosed in the present disclosure, smooth and high-quality rotation up to 360° between the first main body 1 and the second main body 2 is realized in the electronic apparatus according to the present disclosure.

In the accompanying drawings described above, the first main body 1 and the second main body 2 are illustrated as display side and system side, which are quite different in appearance from each other. However, the shape design of the first main body 1 and the second main body 2 and the overall design of the electronic apparatus can be in different solutions and have variations, as briefly described below.

Figure 18:
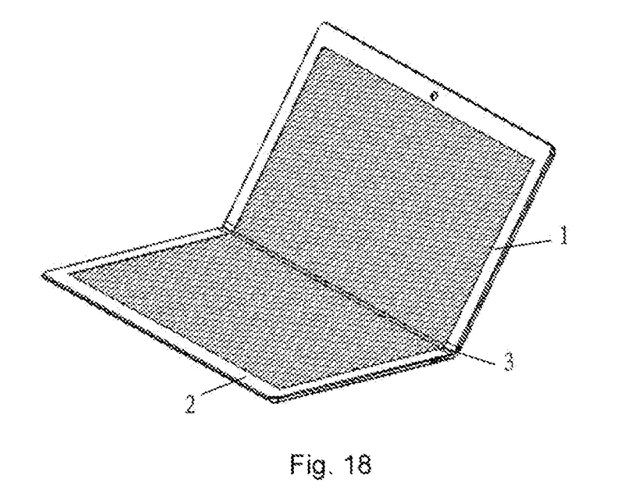
FIG. 18 is a 3D view of the electronic apparatus with an integral display screen according to the present disclosure, wherein the first main body and the second main body are at an angle in relation to each other.
Figure 19:
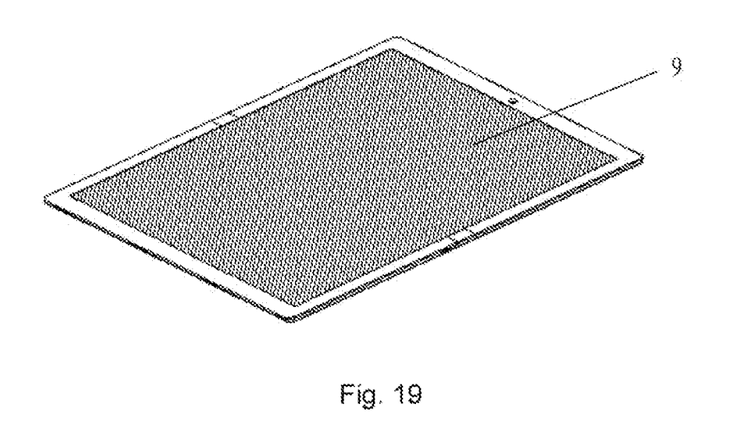
FIG. 19 is a 3D view of the electronic apparatus with an integral display screen according to the present disclosure, wherein the first main body and the second main body are in a 180° unfolded state.

As shown in FIG. 18 and FIG. 19, the electronic apparatus also includes a first main body 1, a second main body 2, and a rotating mechanism 3 disposed between the first main body 1 and the second main body 2. However, in appearance, the electronic apparatus employs an integral display screen, which can be rotated up to 360° by means of the rotating mechanism 3. Apparently, the electronic apparatus can be embodied as a tablet PC.

Figure 20:
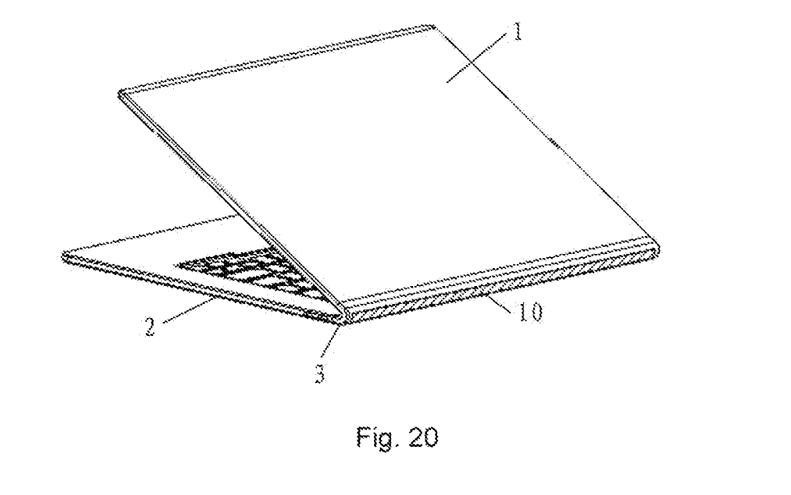
FIG. 20 and FIG. 21 are 3D views of the electronic apparatus with a small display screen fitted at a part of the electronic apparatus corresponding to the connecting device according to the present disclosure, wherein the first main body and the second main body are in different folded states in FIG. 20 and FIG. 21.

Please see FIG. 20, wherein at least the first main body 1 is provided with a display screen and forms a display part, and the second main body 2 is provided with a physical keyboard structure. Please note: on the back of the electronic apparatus, a small display screen is fitted at a part corresponding to the rotating mechanism 3, to display information that contains prompting or aiding content. In addition, as an alternative option, at the same side as the first main body 1 and the display screen, an additional small display screen can be fitted at a part corresponding to the rotating mechanism 3, to display information that contains prompting or aiding content.

Figure 21:
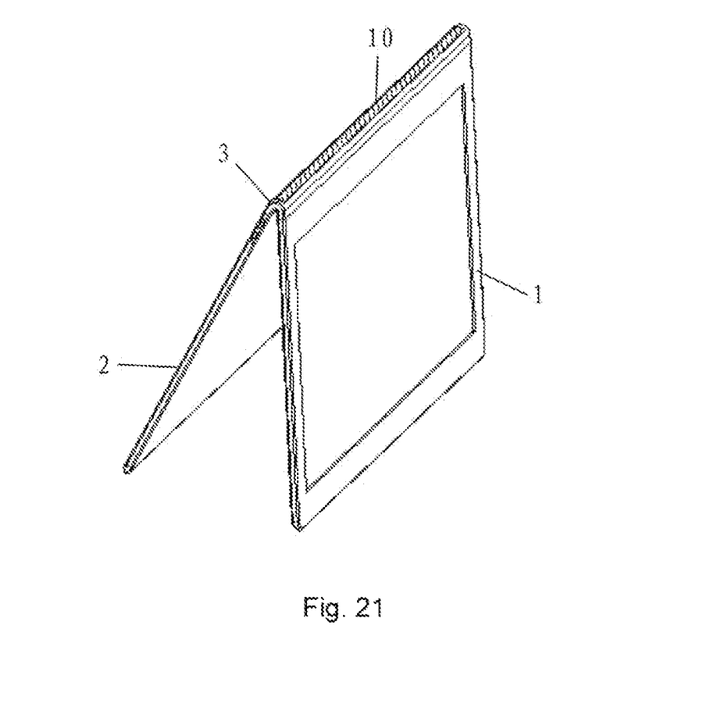

Please see FIG. 21, wherein the electronic apparatus is fitted with a small display screen at a part corresponding to the rotating mechanism 3, and both the first main body 1 and the second main body 2 of the electronic apparatus can be fitted with a display screen, such as a touch screen. Similarly, as an alternative option, on the back of the electronic apparatus, an additional small display screen can be fitted at a part corresponding to the rotating mechanism 3, between the two separate display screens on the first main body 1 and the second main body 2, to display information that contains prompting or aiding content.

Moreover, though the electronic apparatus shown in FIG. 18 and FIG. 19 is fitted with an integral display screen, a separate small display screen can be presented by means of electronic control at a part corresponding to the rotating mechanism, to display information that contains prompting or aiding content. In addition, as an alternative option, just like the embodiment shown in FIG. 20 and FIG. 21, on the back of the electronic apparatus, an additional small display screen can be fitted at a part corresponding to the rotating mechanism 3.

Some embodiments of the connecting device and electronic apparatus disclosed in the present disclosure are described above. The specific features of the connecting device and electronic apparatus disclosed in the present disclosure, such as shape, size, and position, can be designed specifically on the basis of the features disclosed above, and all these designs can be envisaged by those skilled in the art. In addition, the technical features disclosed above are not limited to the disclosed combinations with other features. Those skilled in the art can make various other combinations among the technical features for the purpose of the invention, as long as the objects of the present disclosure can be attained.

The invention claimed is:

1. A connecting device configured to rotatably connect a first main body and a second main body of an electronic apparatus, the connecting device comprising:
   a rotating mechanism rotatably connecting the first main body and the second main body;
   a bendable coating mechanism covering at least a part of the rotating mechanism, wherein the coating mechanism comprises a first bendable coating element that covers a first side of the rotating mechanism, and a second bendable coating element that covers a second side opposite to the first side of the rotating mechanism, the first bendable coating element and the second bendable coating element sandwich the rotating mechanism in parallel, when the rotating mechanism rotates, one of the first bendable coating element and the second bendable coating element is stretched, and the other is compressed; and
   a magnetic mechanism magnetically coupling the coating mechanism and the rotating mechanism together.

2. The connecting device of claim 1, wherein the magnetic mechanism comprises a first magnetic element disposed on the coating mechanism and a second magnetic element disposed on the rotating mechanism, coupling each other together magnetically.

3. The connecting device of claim 1, wherein the rotating mechanism comprises elements made of a ferromagnetic material and the magnetic mechanism includes the magnetism of the first coating element.

4. The connecting device of claim 3, wherein the magnetic mechanism includes the magnetism of the second coating element.

5. The connecting device of claim 4, wherein the magnetisms of the first coating element comprises a first magnetism part and the second coating element comprises a second magnetism part, and the first magnetism part and the second magnetism part produce force of attraction with each other as the rotating mechanism is rotated or bent.

6. The connecting device of claim 5, wherein the first magnetism part and the second magnetism part are made of a magnetic material.

7. The connecting device of claim 2, wherein the first magnetics element is attached to a bending part of the coating mechanism and the bending part is bent as the rotating mechanism is rotated or bent.

8. The connecting device of claim 6, wherein a magnetic element/magnetic elements having magnetism is/are attached to a bending part/bending parts of the first coating element and/or the second coating element, and the bending part/bending parts is/are bent as the rotating mechanism is rotated or bent.

9. The connecting device of claim 1, wherein the magnetism is arranged discontinuously along a transverse axis of the rotating mechanism.

10. The connecting device of claim 1, wherein the coating mechanism is a flexible coating component made of silica gel.

11. The connecting device of claim 1, wherein the rotating mechanism is formed into a strip shape.

12. An electronic apparatus comprising the connecting device according to claim 1, wherein at least one of the first main body and the second main body is fitted with a display screen, or the first main body and the second main body are fitted with an integral display screen which can be bent freely at a part corresponding to the connecting device.

13. The electronic apparatus of claim 12, wherein in the case that at least one of the first main body and the second main body is fitted with the display screen, the electronic apparatus is provided with an additional small display screen configured to display information that contains prompting or aiding content at least at one side of a part of the electronic apparatus corresponding to the connecting device; or
   in the case that the first main body and the second main body are fitted with the integral display screen, the part of the integral display screen corresponding to the connecting device can display as a small display screen for displaying information that contains prompting or aiding content, and/or the electronic apparatus is fitted with an additional small display screen configured to display information that contains prompting or aiding content at the other side of the connecting device.

14. The electronic apparatus of claim 12, wherein the electronic apparatus is a tablet PC.

* * * * *